United States Patent Office 3,234,261
Patented Feb. 8, 1966

3,234,261
PROCESS FOR PREPARING DIARYL CARBONATES
Raymond P. Kurkjy, Geneva, Switzerland, Markus Matzner, Edison Township, Middlesex County, and Robert J. Cotter, New Brunswick, N.J., assignors to Union Carbide Corporation, a corporation of New York
No Drawing. Filed July 3, 1962, Ser. No. 208,670
13 Claims. (Cl. 260—463)

The present invention relates in general to the preparation of diaryl carbonates, and more particularly it relates to a novel anhydrous process for reacting aryl monochloroformates inter se to form diaryl carbonates.

Diaryl carbonates, typified by diphenyl carbonate, are well known compounds which heretofore have been prepared by a variety of chemical reactions. For example it has been proposed to react phenols with phosgene in the presence of equimolar quantities of organic tertiary bases to bind the hydrogen chloride produced as a by-product. Aqueous sodium hydroxide has also been employed to neutralize the hydrogen chloride in such reactions.

It has further been proposed to obtain diaryl carbonates by reacting an appropriate aryl chloroformate with pyridine and water. Insofar as is presently known, however, no operable anhydrous reaction system has been proposed in which the inter se condensation of aryl chloroformates to form diaryl carbonates is accomplished.

It is therefore the general object of the present invention to provide a novel non-aqueous process for preparing diaryl carbonates in which the necessity for removal of large amounts of contaminating catalyst residues and reaction byproducts is avoided or at least greatly reduced.

This general object as well as other and more particular objects which will be obvious from the specification are accomplished in accordance with the process of this invention which comprises heating at elevated temperatures an anhydrous reaction system comprising an aryl monochloroformate and a metal oxide of a metal of Groups I–B, II–A, and II–B of the Deming Periodic System of Elements.

The aryl chloroformates suitably employed in the present process have the general formula

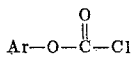

wherein Ar represents a monovalent aromatic radical free of substituent groups reactive in the reaction system employed. Thus Ar can be an unsubstituted phenyl, α-naphthyl, β-naphthyl, anthryl, or phenanthryl radical, or any of these radicals which contain one or more inert ring substituents free of acetylenic unsaturation as for example alkyl such as methyl, ethyl, propyl, butyl, isopropyl, amyl, octyl; alkenyl such as ethenyl, propenyl; aryl, such as phenyl, methylphenyl, napthyl, chlorophenyl, ethylchlorophenyl, halogen such as chlorine, bromine, fluorine; nitro; oxyalkyl such as oxymethyl, oxyhexyl; cycloalkyl such as cyclobutyl, cyclopentyl, cyclohexyl, and the like.

Preferably the aryl chloroformates conform to the general formula (I)
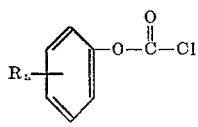

wherein R is a monovalent hydrocarbon radical free of aliphatic unsaturation and containing from 1 to 10 carbon atoms and $n$ has a value of from 0 to 4 inclusive. Most particularly preferred are those species conforming to structural Formula I above wherein R is an alkyl group containing from 1 to 3 carbon atoms and $n$ has a value of from 0 to 1.

The metal oxide reagents suitably employed are the oxides of metals constituting those classified as Groups I–B, II–A and II–B of the Periodic System of Elements according to Deming [Handbook of Chemistry and Physics, page 312, 30th ed. (1947), Chemical Rubber Publishing Co., Cleveland, Ohio.] in which the metal is in its highest oxidation state. The metals of these three groups of greatest practical value due to their ready availability are copper, silver, gold, beryllium, magnesium, calcium, strontium, barium, zinc, cadmium, and mercury. The corresponding oxides which are employed as reagents in the present process are CuO, $Ag_2O$, $Au_2O_3$, ZnO, CdO, HgO, BeO, MgO, CaO, SrO, and BaO. The oxides of metals of Group II–A, and especially magnesium, are preferred.

The proportion of metal oxide relative to the aryl chloroformate in the reaction mixture is not a narrowly critical factor. Although we do not wish to be bound by any particular theory or reaction mechanism it is believed that the reaction proceeds according to the following general equation in which R represents an aryl radical and Met represents a metal, both described hereinbefore.

For a theoretically complete reaction, therefore, the stoichiometric quantity of metal oxide is one mole for each two moles of aryl chloroformate present. It will be obvious to those skilled in the art, however, that even large excesses of either reagent will not destroy the fundamental reaction.

The reaction can be accomplished either in bulk, preferably with the aryl chloroformate in the molten state or in an inert solvent medium. Suitable solvents serving as the reaction medium are advantageously the higher boiling halogenated hydrocarbons such as chlorobenzene, o-dichlorobenzene, and sym. tetrachloroethane, but other conventional solvents such as benzene, toluene, xylenes, carbon tetrachloride, chloroform, and the like can also be used.

Reaction temperatures are not critical, but optimum values vary depending primarily upon the particular aryl chloroformate employed. In bulk reaction systems, temperatures within the range of from about 70° C. to about 200° C. have been found to be entirely suitable. In reactions carried out in an inert solvent medium under reflux conditions, the boiling temperature of the solvent is determinative of the reaction temperature at atmospheric pressure.

By employing mixtures of aryl chloroformates the present process is readily employed to prepare mixed diaryl carbonates.

The present invention is more fully illustrated by the following examples. It is to be understood that these examples are in no way intended to be limitative of the proper scope of the invention which is defined in the appended claims.

EXAMPLE 1

To a glass reactor equipped with a thermometer, stirring means, and a reflux condenser were charged 5 grams (0.032 mole) phenyl chloroformate, 0.65 gram (0.016 mole) magnesium oxide (MgO, analytical grade which had previously been ignited in a porcelain crucible for 45 minutes at about 700° C.) and 25 ml. chlorobenzene. The reaction mixture was thereafter heated at the reflux temperature of chlorobenzene for a period of about 20 hours. During the heating period carbon dioxide was evolved from the reactor, the rate of evolution being especially rapid in the initial stages of the reaction. No color developed during the heating. The reaction system was then cooled to room temperature and filtered. The colorless filtrate was evaporated to dryness to yield a white residue of diphenyl carbonate. Recrystallization of this residue from n-heptane yielded 96 weight percent of pure white product having a melting point range of 78–79° C.

EXAMPLES 2–8

Using apparatus substantially the same as described in Example 1 a variety of diaryl carbonates are produced using a variety of metal oxides and solvent media. The reaction formulations and resulting diaryl carbonate products are set forth in Table I below:

Table I

| Ex. No. | Chloroformate reagent | Metal oxide | Molar Ratio, $Ar-O-\overset{O}{\underset{\|}{C}}-Cl/Met-O$ | Solvent medium | Reaction temperature, °C. | Reaction period, hrs. | Reaction Products |
|---|---|---|---|---|---|---|---|
| 2 | o-Cresyl chloroformate | BeO | 2:1 | Toluene | 110 | 18 | Di-o-cresyl carbonate. |
| 3 | α-Naphthyl chloroformate | CuO | 2:1.05 | o-Dichlorobenzene. | 180 | 5 | Di-α-naphthyl carbonate. |
| 4 | 50 mole percent phenylchloroformate plus 50 mole percent p-chlorophenyl chloroformate. | CdO | 1.5:1 | Tetrachloroethane. | 146.3 | 15 | Diphenyl carbonate, di-(chlorophenyl) carbonate, phenyl chlorophenyl carbonate. |
| 5 | Phenyl chloroformate | CaO | 2:1 | Chlorobenzene | 132 | 25 | Diphenyl carbonate. |
| 6 | ....do | ZnO | 2:1 | None | 180 | 8 | Diphenyl carbonate. |
| 7 | β-Naphthyl chloroformate | BaO | 1:1 | None | 200 | 20 | Di-(β-naphthyl)carbonate. |
| 8 | Phenyl chloroformate | Ag₂O | 2:1 | o-Dichlorobenzene. | 180 | 20 | Diphenyl carbonate. |

The diaryl carbonates prepared in accordance with the present process find extensive use as carbonate precursors in the preparation of polycarbonate resins by the method well known as ester-interchange.

What is claimed is:
1. The process for preparing a diaryl carbonate which comprises heating under anhydrous conditions at a temperature of between about 70° C. to 200° C. and sufficient to cause the evolution of carbon dioxide a reaction mixture comprising an aryl chloroformate having the general formula

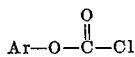

wherein Ar is selected from the group consisting of aryl and aryl substituted by a member selected from the group consisting of alkyl, alkenyl, aryl, halogen, nitro, oxyalkyl and cycloalkyl and a metal oxide of a metal selected from the class consisting of Groups I–B, II–A, and II–B of the Periodic System of Elements, the metal ion of said oxide being in its highest oxidation state.

2. Process according to claim 1 wherein the aryl chloroformate has the general formula

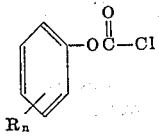

wherein R is a monovalent hydrocarbon radical free of acetylenic unsaturation and containing from 1 to 10 carbon atoms and n has a value of from 0 to 4 inclusive.

3. Process according to claim 2 wherein n has a value of zero.

4. Process according to claim 2 wherein the metal oxide is of a metal of Groups I–B of the Periodic System of Elements.

5. Process according to claim 2 wherein the metal oxide is of a metal of Group II–B of the Periodic System of Elements.

6. Process according to claim 2 wherein the metal oxide is of a metal of Group II–A of the Periodic System of Elements.

7. Process according to claim 6 wherein the metal oxide is MgO.

8. Process according to claim 6 wherein the metal oxide is CaO.

9. Process for preparing diphenyl carbonate which comprises maintaining under refluxing conditions at a temperature of between about 70° C. and 200° C. and sufficient to cause the evolution of carbon dioxide, an anhydrous reaction mixture comprising an inert organic solvent medium and substantially equimolar quantities of phenyl chloroformate and a metal oxide of a metal selected from the class consisting of Groups I–B, II–A, and II–B of the Periodic System of Elements, the metal ion of said oxide being in its highest oxidation state.

10. Process according to claim 9 wherein the inert organic solvent is o-dichlorobenzene.

11. Process according to claim 9 wherein the metal oxide is ZnO.

12. Process according to claim 9 wherein the metal oxide is CaO.

13. Process according to claim 9 wherein the metal oxide is MgO.

References Cited by the Examiner

UNITED STATES PATENTS 2,837,555   6/1958   Lee _____ 260—463

OTHER REFERENCES

Gomberg et al.: J.A.C.S. 47, 201–202 (1925).
Rodd: "Chemistry of Organic Compounds," vol. IB, p. 888 (1952).

CHARLES B. PARKER, *Primary Examiner.*